United States Patent [19]

Koishi et al.

[11] Patent Number: 5,130,365
[45] Date of Patent: Jul. 14, 1992

[54] FLUORORESIN BASED COATING COMPOSITION APPLICABLE TO PLASTIC SURFACES

[75] Inventors: Toshio Koishi, Sakado; Sinzi Nanba, Saitama, both of Japan

[73] Assignee: Central Glass Company, Limited, Ube, Japan

[21] Appl. No.: 665,889

[22] Filed: Mar. 7, 1991

[30] Foreign Application Priority Data

Mar. 14, 1990 [JP] Japan ..................... 2-63447
Jun. 11, 1990 [JP] Japan ..................... 2-152240

[51] Int. Cl.$^5$ ............................. C08L 27/12
[52] U.S. Cl. ..................... 524/520; 524/94; 524/359; 525/125; 525/199
[58] Field of Search ............ 524/94, 359, 520; 525/125, 199

[56] References Cited

U.S. PATENT DOCUMENTS

| | | | |
|---|---|---|---|
| 4,631,326 | 12/1986 | Koishi et al. | 526/249 |
| 4,857,572 | 8/1989 | Meier et al. | 524/222 |
| 4,931,505 | 6/1990 | Miyazaki et al. | 525/155 |
| 4,954,589 | 9/1990 | Sugawara et al. | 526/255 |
| 5,008,459 | 4/1991 | Meier et al. | 524/222 |
| 5,021,480 | 6/1991 | Ravichandran | 524/99 |

FOREIGN PATENT DOCUMENTS

1012740 6/1984 Japan ..................... 524/359

*Primary Examiner*—Paul R. Michl
*Assistant Examiner*—Andrew E. C. Merriam
*Attorney, Agent, or Firm*—Fleit, Jacobson, Cohn, Price, Holman & Stern

[57] ABSTRACT

The invention relates to a coating composition suitable for application to plastic surfaces. The coating composition comprises, as essential components, 100 parts by weight of a chlorotrifluoroethylene based copolymer having hydroxyl group as a functional group, a curing agent for the copolymer such as a polyisocyanate, 0.5-30 parts by weight of an acrylic or methacrylic polymer which serves as an adhesion improving component, and an organic solvent. Usually the composition contains an ultraviolet absorber and another light stabilizer. For example, on a polycarbonate article this composition provides a durable coating film without marring the transparency and healthiness of the polycarbonate substrate. By the addition of a pigment the coating is modified into a paint composition which is particularly useful for repairing a bake finished paint film formed by using a polyvinylidene based paint.

25 Claims, No Drawings

FLUORORESIN BASED COATING COMPOSITION APPLICABLE TO PLASTIC SURFACES

BACKGROUND OF THE INVENTION

This invention relates to a coating composition which uses a curable, fluoroolefin based copolymer as a basic component and is particularly suitable for application to polycarbonate resin surfaces and also for repairs of polyvinylidene fluoride based paint films.

Polycarbonate is excellent in various properties such as mechanical strength, dimensional stability, electrical insulation and heat resistance and has widely been used as an engineering plastic for electric and electronic parts, machine parts and housings, household utensils, and so on. Further, polycarbonate serves as a platic glass since this resin is very transparent and high in shock resistance, and recently the use of polycarbonate glass in buildings and automobiles is increasing.

However, polycarbonate is not sufficiently high in weather resistance and chemical resistance. When a polycarbonate article is used outdoors it deteriorates mainly by the action of ultraviolet rays in the sunlight to often result in the occurrence of yellowing, loss of transparency and/or crazing besides gradual lowering of tensile strength and elongation. As to chemical resistance, polycarbonate is susceptible to crazing and loss of transparency by the action of alkalis or organic solvents. Usually polycarbonate resins contain an ultraviolet absorbing agent for improvement in weatherability, but the effect is not always satisfactory, and the chemical resistance is not improved by the addition of an ultraviolet absorbing agent.

For some limited uses it is known to coat the surfaces of polycarbonate articles with another resin, such as acrylic resin, urethane resin or acryl-urethane resin, containing an ultraviolet absorbing agent thereby to improve both weatherability and chemical resistance, but this measure is not yet fully satisfactory since the resin used as the coating material is not excellent in weatherability.

JP-A 1-249839 shows a coating composition for application to polycarbonate surfaces. Essentially the coating composition is a solution of a fluroolefin based copolymer in an organic solvent and contains an ultraviolet absorbing agent and some other additives. Using this composition it is possible to form a coating film high in both weather resistance and chemical resistance on a polycarbonate surface. However, we have recognized that the adhesion of this coating film to the polycarbonate surface considerably weakens when the coated article is exposed to the sunlight for a long period of time. There is a possibility of overcoming this shortcoming by application of a suitable primer in advance of applying the fluoroolefin based paint, but this is an increase in the steps of a painting process and hence unfavorable for productivity.

Meanwhile, bake finish paints using polyvinylidene fluoride (PVD) as the principal component of the vehicle have been used as facing or top-coat paints. PVDF based paints give beautiful and long durable paint films and have largely been used for producing precoated metal sheets.

In factories, painting operations using PVDF based paints can be accomplished with good and stable quality of the products, but paints of this type are unsuitable for field painting because of needing baking finish. However, in practically using precoated metal sheets often there is the need of repairing the paint film because the paint film is liable to be locally damaged during handling and fitting of the precoated metal sheets. For repairing in fields it is impracticable to use a PVDF based paint for the aforementioned reason, and hence it is inevitable to use a paint of a different type. At present it is usual to use a paint of room temperature setting type, such as an acrylic resin paint or a fluororesin paint using a fluoroolefin based copolymer as the resin, for field repairs of PVDF based paint films. However, acrylic resin paints are generally insufficient in weatherability, and room temperature setting paints using a fluoroolefin based copolymer are not very strong in adhesion to PVDF based paint films.

A paint film formed by using a PVDF based paint is relatively low in surface energy because of a high content of fluorine. Therefore, in the case of coating this paint film with another paint for the purpose of repairing it is difficult to accomplish strong adhesion of the overlying paint film to the initially formed paint film. Sometimes the paint film to be repaired is ground precedent to the repairing painting to physically strengthen the adhesion of the repairing paint film, but this is troublesome and does not always give good results. From another aspect, the repairing paint is required to be comparative to PVDF based paints in the excellence of paint films in weather resistance, chemical resistance and soil resistance.

SUMMARY OF THE INVENTION

It is an object of the present invention to provide a coating composition which is applicable to a polycarbonate surface or a different plastic surface and provides a coating film excellent in weather resistance and chemical resistance and also in adhesion to the plastic surface.

It is another object of the invention to provide a coating composition which is practicable as a room temperature setting paint for repairing a bake finished paint film formed by using a PVDF based paint.

According to the invention there is provided a coating composition which comprises 100 parts by weight of a chlorotrifluoroethylene (CTFE) based copolymer having hydroxyl group as a functional group, a curing agent for the copolymer, 0.5 to 30 parts by weight of an adhesion improving polymer selected from acrylic polymers and methacrylic polymers and an organic solvent. The CTFE based copolymer comprises 25 to 75 mol % of repeating units originating from CTFE, 10 to 70 mol % of repeating units originating from a carboxylic acid vinyl ester and 3-40 mol % of repeating units originating from a hydroxyl containing allyl ether.

The CTFE based copolymer used in this invention is disclosed in U.S. Pat. No. 4,631,326. As a solution in an organic solvent with addition of a curing agent, this copolymer provides a coating composition which is applicable to polycarbonate articles without marring transparency and healthiness of the polycarbonate substrates, and it is possible to form a transparent coating film excellent in weather resistance and chemical reistance by adding an ultraviolet absorbing agent and another light stabilizer to the coating composition. However, the durability of the coating film is insufficient in respect of adhesion to the polycarbonate surface. We have discovered that the durability of the adhesion of the coating film is remarkably improved by the addition of an acrylic or methacrylic polymer to the coating composition using the CTFE based copolymer.

It is preferable to use an essentially homopolymer of methyl methacrylate or a copolymer of methyl methacrylate with a relatively small amount (up to about 5 wt %) of a vinylic amino compound as the adhesion improving agent. According to the need the coating composition contains a known ultraviolet absorbing agent and/or another known light stabilizer.

The application of a coating composition according to the invention is not limited to polycarbonate articles. This coating composition is applicable also to methacrylic resin articles and other various plastic articles.

A coating composition according to the invention can easily be modified into a paint composition by the addition of a pigment. By selecting a suitable curing agent, such as a polyisocyanate, the paint composition is settable at room temperature, and the paint composition is useful for repairing a bake finished paint film formed by using a PVDF based paint. Also in this case the paint film formed by using the invention is very good in adhesion to the underlying PVDF based paint film.

DESCRIPTION OF THE PREFERRED EMBODIMENTS

As a fluororesin, this invention uses a CTFE based multicomponent copolymer.

The second component of the CTFE based copolymer is vinyl ester of an aliphatic carboxylic acid which may have either a straight-chain structure or a branched structure. It is preferable that the carboxylic acid has 2 to 12 carbon atoms, and preferred examples of useful vinyl esters are vinyl acetate, vinyl lactate, vinyl butyrate, vinyl isobutyrate, vinyl caproate, vinyl isocaproate, vinyl pivalate, vinyl caprylate, vinyl caprate, and VEOVA-9 and VEOVA-10 which are tradenames of Showa-Shell Petroleum Chemicals. Co. for vinyl esters of synthetic monocarboxylic acids having 9 and 10 carbon atoms, respectively. Both VEOVA-9 and VEOVA-10 have a branched structure represented by the following formula:

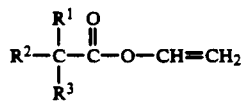

wherein $R^1$, $R^2$ and $R^3$ are alkyl groups at least one of which is methyl group.

It is possible to jointly use two or more kinds of carboxylic acid vinyl esters.

The third component, which provides a functional group to the copolymer, is a hydroxyl-containing allyl ether. Examples of useful allyl ethers are ethylene glycol monoallyl ether, diethylene glycol monoallyl ether, triethylene glycol monoallyl ether and a modified allyl ether which is obtained by modifying ethylene glycol monoallyl ether with ε-caprolactone and represented by the following formula:

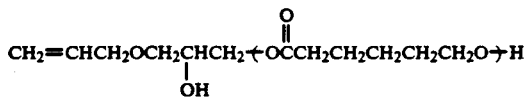

The amounts of these essential components of the copolymer are limited within the ranges specified hereinbefore, respectively, in view of the following tendencies.

If the amount of CTFE is too large the copolymer becomes low in solubilities in organic solvents and, besides, it becomes difficult to prepare the copolymer at good yield. If the amount of CTFE is too small the copolymer becomes insufficient in chemical resistance and weather resistance. It is preferred that in the copolymer CTFE amounts to 40–60 mol %. If the amount of the carboxylic acid vinyl ester is too small the copolymer will become too low in molecular weight, and some difficulties will arise in preparing the copolymer. If the amount of this component is too large the copolymer becomes insufficient in chemical resistance and weather resistance. It is preferred that repeating units originating from carboxylic acid vinyl ester(s) amount to 20–50 mol %. If the amount of the hydroxyl-containing allyl ether is too small the copolymer does not readily undergo curing reaction and, hence, becomes insufficient in chemical resistance and weather resistance, and the coating composition using the copolymer becomes poor in recoatability. If the amount of this component is too large the copolymer will become too low in molecular weight. It is preferred that the hydroxyl-containing allyl ether amounts to 5–30 mol % of the copolymer.

Besides the above described essential components the CTFE based copolymer may optionally use another comonomer or a plurality of different comonomers on condition that the total amount of the optional comonomer(s) is not more than 20 mol % of the copolymer. Examples of optional comonomers are acrylic or methacrylic esters such as hydroxyethyl acrylate, methyl methacrylate and glycidyl methacrylate, carboxyl-containing compounds such as vinylacetic acid, allyloxyacetic acid, acrylic acid, methacrylic acid and itaconic acid, alkenes such as ethylene and propylene, acrylic amides such as acrylamide and N-methylol acrylamide, and vinyl ethers such as ethylvinyl ether and butylvinyl ether.

For the copolymerization of the above described monomers a radical polymerization initiator or an ionic radiation is used, and the copolymerization can be carried out by emulsion polymerization, suspension polymerization, bulk polymerization or solution polymerization.

A CTFE based copolymer used in this invention has hydroxyl group as a functional group and hence can easily be cured by using a conventional curing agent. For curing at normal temperature it is suitable to use a polyisocyanate as the curing agent. For curing at elevated temperatures the curing agent can be selected from blocked polyisocyanates, melamine or urea resins and polybasic acids. The curing agent is selected with consideration of its compatibility with the CTFE based copolymer. For 100 parts by weight of the CTFE based copolymer in a coating composition according to the invention a suitable amount of the curing agent ranges from 0.1 to 100 parts by weight, and a preferred amount is from 0.5 to 30 parts by weight. If the amount of the curing agent is less than 0.1 part the copolymer cannot completely be cured, so that the obtained coating is insufficient in weather resistance and chemical resistance. When the amount of the curing agent exceeds 100 parts the coating composition becomes relatively small in the amount of the CTFE based copolymer, and this is unfavorable for the durability of the obtained coating.

A coating composition according to the invention includes a solvent-thinner. The CTFE based copolymer in this composition is soluble in various organic solvents such as ketones, esters, cyclic ethers, aromatic solvents and chlorine containing solvents. Usually the solvent-thinner is a mixture of organic solvents for the CTFE based copolymer. Particularly when it is intended to apply the coating composition to polycarbonate articles the solvent-thinner should be chosen carefully in order to form a transparent coating without causing crazing or loss of transparency of the polycarbonate surface. In this regard it is preferable that the solvent-thinner contains at least one kind of cyclic ether such that the total amount of the cyclic ether(s) is not less than 50 wt %. Preferred cyclic ethers are ethylene oxide, tetrahydrofuran and dioxane.

Another essential component of the coating composition is an adhesion improving polymer, which can be selected from conventional acrylic resins and methacrylic resins on the market. It is preferable to use a homopolymer of methyl methacrylate (MMA) or a MMA based copolymer, for example, with a vinylic amino compound, and it is preferable that the employed polymer or copolymer has a number average molecular weight of about 30000–60000. A good example of commercially available methacrylic resins is SC-462 of SONY Chemicals Co., which is a copolymer of MMA and a relatively small amount of ethyleneimine. Other examples of useful MMA based resins are ACRYPET VH of Mitsubishi Rayon Co., and PARAPET HR1000NP and PARAPET GF100 of Kyowa Gas Chemicals Co. These commercial MMA based resins are from about 30000 to about 60000 in number average molecular weight, from about 650 to 750 in tensile strength, about 5% in elongation, about 1000–1200 kg/cm² in flexural strength and about $6 \times 10^{-5}$ cm/cm.°C. in linear expansion coefficient.

For 100 parts of the CTFE based copolymer in the coating composition a suitable amount of the adhesion improving polymer ranges from 0.5 to 30 parts by weight, and preferably from 3 to 15 parts by weight. If the amount of the acrylic or methacrylic polymer exceeds 30 parts there arises a problem about compatibility of this polymer with the CTFE based copolymer, and the transparency of the coating composition lowers. It is convenient to dissolve the acrylic or methacrylic polymer in an organic solvent in advance of mixing with the CTFE based copolymer. In the case of preparing a coating composition for application polycarbonate articles the solvent for the acrylic or methacrylic polymer should be chosen so as to allow the presence of at least 50 wt % of cyclic ether in the solvent-thinner of the obtained coating composition.

Preferably a coating composition according to the invention contains an ultraviolet absorbing agent such as a benzophenone compound such as 2-hydroxy-4-methoxybenzophenone or 2-hydroxy-4-n-octoxybenzophenone, a benzotriazole compound such as 2-(2'-hydroxy-5'-methylphenyl)benzotriazole, 2-(2'-hydroxy-5'-t-octylphenyl)-benzotriazole or 2-(2'-hydroxy-3',5'-di-t-amylphenyl)-benzotriazole or an acrylate such as ethyl-2-cyano-3,3-diphenyl acrylate. The amount of the ultraviolet absorbing agent is determined so as not to mar the properties of the coating composition and so as not to exceed 30 parts by weight per 100 parts by weight of the CTFE based copolymer. Also it is preferable to include a light stabilizer besides the ultraviolet absorbing agent. As the light stabilizer it is suitable to use a hindered amine, and the amount of the light stabilizer is not more than 20 parts by weight per 100 parts by weight of the CTFE based copolymer in order to prevent bleeding.

A pigment is added to a coating composition according to the invention when the composition is to be used as a paint. Irrespective of the use of a pigment, the coating composition may optionally contain any of common additives such as, for example, antistatic agent, flame retarder, lubricating agent, antimold agent and dispersion stabilizing agent. Of course the amounts of such optional additives are limited so as not mar the important characteristics such as transparency, weather resistance and chemcial resistance of the obtained coating.

The following examples are illustrative of the invention.

CTFE BASED COPOLYMERS

For use in the examples six kinds of CTFE based copolymers, viz. copolymers A, B, C, D, E and F, were prepared by radical copolymerization of the monomers shown in Table 1, wherein the abbreviations stand for the following compounds, respectively.

VAc: vinyl acetate
VBu: vinyl butyrate
VPy: vinyl pivalate
EGMAE: ethylene glycol monoallyl ether (for copolymer F, EGMAE modified with ε-caprolactone)
VAA: vinylacetic acid
Pr: propylene

TABLE 1

| | COPOLYMERS | | | | | |
|---|---|---|---|---|---|---|
| | A | B | C | D | E | F |
| Charged Monomers (mol %) | | | | | | |
| CTFE | 55 | 55 | 55 | 55 | 55 | 55 |
| VAc | 35 | 35 | | | | |
| VBu | | | | 17.5 | | 35 |
| VPy | | | 35 | 17.5 | | |
| EGMAE | 10 | 9 | 9 | 9 | 10 | 9*) |
| VAA | | 1 | 1 | 1 | | 1 |
| Pr | | | | | 35 | |
| Copolymer | | | | | | |
| Molecular Weight (M$_n$) | 17300 | 14700 | 18400 | 18000 | 13900 | 15700 |
| OH Value (mg KOH/g) | 50 | 53 | 48 | 51 | 58 | 109 |
| Acid Value (mg KOH/g) | 0 | 6 | 5 | 7 | 0 | 8 |

*)modified EGMAE

EXAMPLES 1–5

As shown in Table 2, in each of these examples a coating composition was prepared by using one of the above described copolymers A, B, C, D and E, a curing agent for the copolymer, a commercially available MMA based resin, an ultraviolet absorbing agent, a light stabilizer and a mixed solvent-thinner. As to the methacrylic resins: M-1 is PARAPET HR1000NP, M-2 is PARAPET GF100, M-3 is ACRYPET VH, and M-4 is SC-462, all mentioned herein-before. In every example the curing agent was CORONATE EH of Nippon Polyurethane Co., a polyisocyanate. The ultraviolet absorbing agent was a benzotriazole derivative in Examples 1, 3 and 4 and a benzophenone derivative in Ex- Examples 2 and 5. In every example the light stabilizer was a hindered amine.

COMPARATIVE EXAMPLE 1

As shown in Table 2, the coating composition of Example 3 was modified by omitting the methacrylic resin.

The coating composition of each of Example 1-5 and Comparative Example 1 was applied to a polycarbonate plate (3 mm in thickness) by spraying, and then the plate was heated at 100° C. for 60 min to completely cure the coating film. In every case the cured coating film was transparent and had a thickness of about 15 μm, and neither crazing nor loss of transparency was observed in the polycarbonate surface.

The cured coating films of Examples 1-5 and Comparative Example 1 were subjected to measurement of transparency, hardness and adhesion strength and then to an accelerated weathering test. The results are shown in Table 2, wherein Ref. (reference) is the uncoated polycarbonate plate. The transparency is indicated by relative values on the basis of the transparency of the uncoated polycarbonate plate. The adhesion strength was tested by the cross-cut adhesion test according to JIS K 5400, and the result is indicated by the number of no peel areas among 100 areas tested with cellophane tape. The hardness was tested by the pencil scratching test according to JIS K 5400, and the result is indicated by the maximum hardness of pencil that failed to give scratches. The accelerated weathering test was made with a sunshine weatherometer, and the test was continued for 2000 hr. After the weathering test the color difference (ΔE in the L*, a*, b* color system) of the coating film was measured, and the cross-cut adhesion test was repeated.

EXAMPLES 6-8

As shown in Table 3, in each of these examples a paint composition was prepared by using one of the copolymers A, C and F, a curing agent for the copolymer, a MMA based resin, a white pigment and a solvent-thinner. In every case the curing agent was CORONATE EH, and the pigment was a $TiO_2$ powder.

COMPARATIVE EXAMPLES 2 AND 3

As shown in Table 3, the paint compositions of Example 6 and Example 8 were respectively modified by omitting the methacrylic resin.

Each of the paint compositions of Examples 6-8 and Comparative Examples 2 and 3 was applied by spraying onto a bake finished PVD based paint film on a metal plate, and the coated plate was left standing for 10 days at room temperatures thereby to completely cure the CTFE based paint film. In every case the cured paint film was good in appearance and had a thickness of about 25 μm.

The paint films of Examples 6-8 and Comparative Examples 2 and 3 were subjected to the pencil hardness test and the cross-cut adhesion test. The results are shown in Table 3. Further, samples of the respective paint films were kept immersed in boiling water for 5 hr and thereafter subjected to the cross-cut adhesion test. Separate samples of the respective paint films were subjected to an accelerated weathering test with a sunshine weatherometer. The weathering test was continued for 1000 hr, and then the surface gloss of each paint film was measured by comparison with that of the same paint film before the weathering test, and the cross-cut adhesion test was repeated. The results were as shown in Table 3.

TABLE 2

| | PAINT COMPOSITIONS | | | | | | |
|---|---|---|---|---|---|---|---|
| | Ex. 1 | Ex. 2 | Ex. 3 | Ex. 4 | Ex. 5 | Ref. | Comp. Ex. 1 |
| Composition (parts by weight) | | | | | | | |
| Fluororesin (Copolymer) | A: 12.2 | B: 12.2 | C: 12.2 | D: 12.2 | E: 12.2 | — | C: 12.2 |
| Methacrylic resin | M-1: 0.6 | M-2: 0.6 | M-1: 0.6 | M-3: 0.6 | M-4: 0.6 | — | — |
| Curing Agent | 2.1 | 2.1 | 2.1 | 2.1 | 2.1 | 2.1 | 2.1 |
| UV Absorbent | 0.6 | 0.6 | 0.6 | 0.6 | 0.6 | 0.6 | 0.6 |
| Light Stabilizer | 0.2 | 0.2 | 0.2 | 0.2 | 0.2 | 0.2 | 0.2 |
| Solvent-thinner | | | | | | | |
| tetrahydrofuran | 67.4 | 55.3 | 59.5 | 59.5 | 59.5 | — | 60.0 |
| cylohexanone | 16.9 | 16.9 | 14.9 | 14.9 | 14.9 | — | 15.0 |
| toluene | — | 4.0 | — | — | — | — | — |
| butyl acetate | — | 8.1 | 9.9 | 9.9 | 9.9 | — | 10.0 |
| Paint Film | | | | | | | |
| Transparency (%) | 98 | 97 | 96 | 98 | 95 | 100 | 96 |
| Adhesion | 100/100 | 100/100 | 100/100 | 100/100 | 100/100 | — | 100/100 |
| Pencil Hardness | H | H | F | F | B | 3B | F |
| Weathering Test Results | | | | | | | |
| Color Difference (ΔE) | 2.1 | 2.4 | 2.0 | 2.6 | 3.5 | 15.6 | 2.1 |
| Adhesion | 100/100 | 100/100 | 100/100 | 100/100 | 100/100 | — | 0/100 |

TABLE 3

| | PAINT COMPOSITIONS | | | | |
|---|---|---|---|---|---|
| | Ex. 6 | Ex. 7 | Ex. 8 | Comp. Ex. 2 | Comp. Ex. 3 |
| Composition (parts by weight) | | | | | |
| Fluororesin (Copolymer) | A: 100 | C: 100 | F: 100 | A: 100 | F: 100 |
| Methacrylic resin | M-1: 5 | M-4: 5 | M-2: 5 | — | — |
| Curing Agent | 18 | 18 | 18 | 18 | 18 |

TABLE 3-continued

| | PAINT COMPOSITIONS | | | | |
|---|---|---|---|---|---|
| | Ex. 6 | Ex. 7 | Ex. 8 | Comp. Ex. 2 | Comp. Ex. 3 |
| Pigment (TiO$_2$) | 50 | 50 | 50 | 50 | 50 |
| Solvent-thinner*) | | | | | |
| Paint Film | | | | | |
| Pencil Hardness | H | H | B | H | 2B |
| Adhesion | | | | | |
| initially | 100/100 | 100/100 | 100/100 | 0/100 | 0/100 |
| after boiling | 100/100 | 100/100 | 100/100 | 0/100 | 0/100 |
| after weathering | 100/100 | 100/100 | 100/100 | 0/100 | 0/100 |
| Gloss Retention (%) after weathering | 95 | 98 | 93 | 96 | 95 |

*)A suitable amount of mixed solvent-thinner in every example.

What is claimed is:

1. A coating composition comprising:
   100 parts by weight of a copolymer which comprises 25 to 75 mol % of first repeating units originating from chlorotrifluoroethylene, 10 to 70 mol % of second repeating units originating from a carboxylic acid vinyl ester and 3-40 mol % of third repeating units originating from a hydroxyl-containing allyl ether;
   a curing agent for said copolymer;
   0.5 to 30 parts by weight of an adhesion improving polymer which is a homopolymer of methyl methacrylate; and
   an organic solvent.

2. A coating composition according to claim 1, wherein the amount of said adhesion improving polymer is in the range from 3 to 15 parts by weight.

3. A coating composition according to claim 1, further comprising an ultraviolet absorbing agent.

4. A coating composition according to claim 3, wherein said ultraviolet absorbing agent is selected from the group consisting of benzophenone compounds and benzotriazole compounds.

5. A coating composition according to claim 3, further comprising another light stabilizer.

6. A coating composition according to claim 5, wherein said light stabilizer is a hindered amine.

7. A coating composition according to claim 1, wherein at least 50 wt % of said organic solvent is at least one cyclic ether.

8. A coating composition according to claim 7, wherein said at least one cyclic ether is selected from the group consisting of ethylene oxide, tetrahydrofuran and dioxane.

9. A coating composition according to claim 1, wherein said curing agent is a polyisocyanate.

10. A coating composition according to claim 1, wherein the carboxylic acid of said carboxylic acid vinyl ester has 2 to 12 carbon atoms.

11. A coating composition according to claim 1, wherein said copolymer further comprises not more than 20 mol % of repeating units originating from a carboxyl-containing monomer.

12. A coating composition according to claim 1, further comprising a pigment.

13. A coating composition comprising:
   100 parts by weight of a copolymer which comprises 25 to 75 mol % of first repeating units originating from chlorotrifluoroethylene, 10 to 70 mol % of second repeating units originating from a carboxylic acid vinyl ester and 3-40 mol % of third repeating units originating from a hydroxyl-containing allyl ether;
   a curing agent for said copolymer;
   0.5 to 30 parts by weight of an adhesion improving polymer which is a copolymer of methyl methacrylate and a vinylic amino compound; and
   an organic solvent.

14. A coating composition according to claim 13, wherein the amount of said adhesion improving polymer is in the range from 3 to 15 parts by weight.

15. A coating composition according to claim 13, further comprising an ultraviolet absorbing agent.

16. A coating composition according to claim 15, wherein said ultraviolet absorbing agent is selected from the group consisting of benzophenone compounds and benzotriazole compounds.

17. A coating composition according to claim 15, further comprising another light stabilizer.

18. A coating composition according to claim 17, wherein said light stabilizer is a hindered amine.

19. A coating composition according to claim 13, wherein at least 50 wt % of said organic solvent is at least one cyclic ether.

20. A coating composition according to claim 19, wherein said at least one cyclic ether is selected from the group consisting of ethylene oxide, tetrahydrofuran and dioxane.

21. A coating composition according to claim 13, wherein said curing agent is a polyisocyanate.

22. A coating composition according to claim 13, wherein the carboxylic acid of said carboxylic acid vinyl ester has 2 to 12 carbon atoms.

23. A coating composition according to claim 13, wherein said copolymer further comprises not more than 20 mol % of repeating units originating from a carboxyl-containing monomer.

24. A coating composition according to claim 13, further comprising a pigment.

25. A coating composition according to claim 13, wherein the vinylic amino compound is ethyleneimine.

* * * * *